Sept. 8, 1942.     G. R. MORRIS     2,295,265
DRILL GRINDER
Filed April 19, 1941     3 Sheets-Sheet 1

INVENTOR.
George R. Morris
BY Harold E. Stonebraker
his Attorney

Sept. 8, 1942.  G. R. MORRIS  2,295,265
DRILL GRINDER
Filed April 19, 1941   3 Sheets-Sheet 2
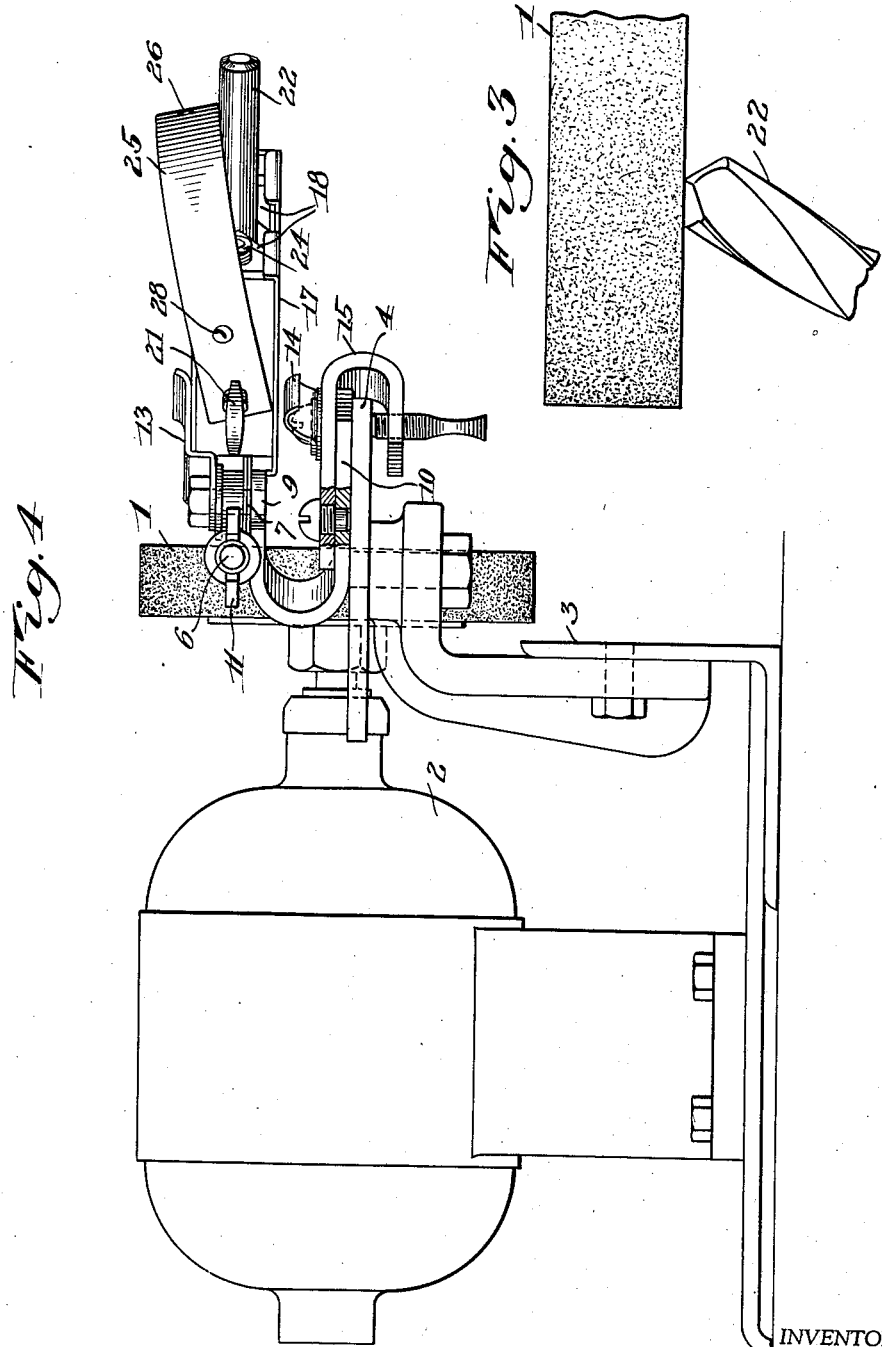
INVENTOR.
George R. Morris
BY Harold E. Stonebraker
his Attorney

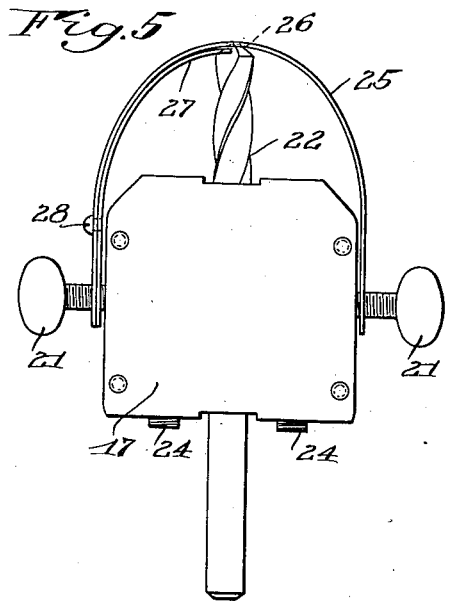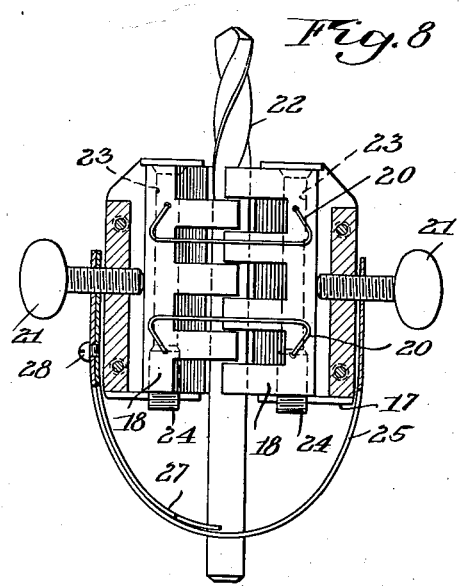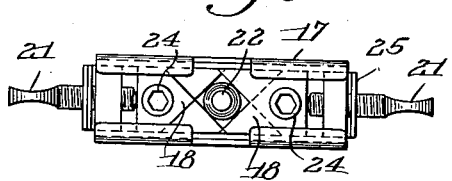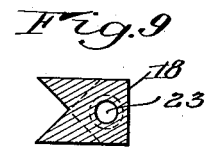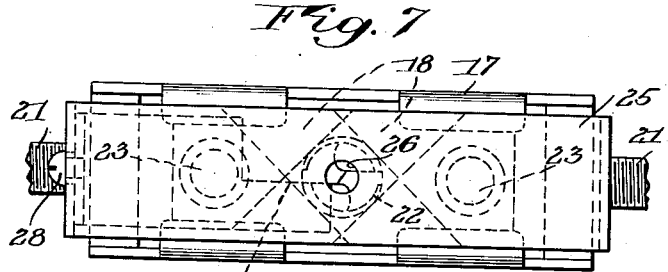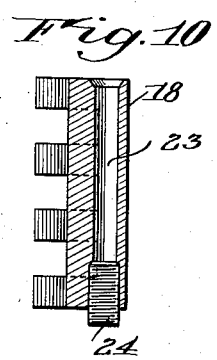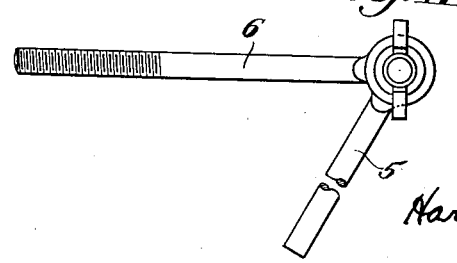

Patented Sept. 8, 1942

2,295,265

UNITED STATES PATENT OFFICE 2,295,265

DRILL GRINDER

George R. Morris, Rochester, N. Y.

Application April 19, 1941, Serial No. 389,289

11 Claims. (Cl. 51—219)

This invention relates to improvements in a drill grinder, with more particular reference to the type of tool known as a twist drill and characterized by two opposite lips or cutting edges formed on a generally conical point with a groove or flute in front of each cutting edge and a clearance surface behind, and it has for its object to afford a structure that will greatly facilitate grinding the cutting edges and clearance surfaces and will insure maintaining the same angle for both cutting edges.

The invention has for a further purpose to afford a construction involving a drill holder that is reversibly positionable on a support for bringing either cutting edge into the same angular relation with the grinding wheel, the drill holder being positioned on the support and manipulated manually by an operator during the grinding operation.

The invention has for another object to provide an oscillatory support in conjunction with a reversible tool holder that is positionable on the oscillatory support for a rocking movement about an independent axis, whereby the drill has a compound movement about two intersecting axes so as to impart a bodily rolling motion to the clearance surface over the grinding wheel in order properly to grind the cutting edge and the clearance surface therebehind.

An additional purpose of the invention is to afford a drill holder with a convenient and practical means for clamping a drill therein with its cutting edges in a predetermined relationship, the drill holder being provided with instrumentalities located on both sides of the longitudinal axis of the drill and parallel thereto for mounting it on the support to oscillate about either of said parallel axes and thus to grind successively the two cutting edges of the drill and their respective clearance surfaces.

Still a further purpose of the invention is to provide a drill holder of the general type mentioned above with means for accurately locating a drill therein both with reference to its endwise adjustment and the position of its cutting edge, preliminarily to clamping it in the holder.

To these and other ends, the invention consists in the construction and arrangement of parts that will appear clearly from the following description when read in conjunction with the accompanying drawing, the novel features being pointed out in the claims following the specification.

In the drawing:

Fig. 3 is a plan view showing the position of the drill in its relation to the grinding wheel at the downward limit of its bodily rolling movement;

Fig. 4 is a side elevation looking from left to right of Fig. 1;

Fig. 5 is a side elevation of the drill holder showing a drill clamped therein, and the positioning plate in operative position;

Fig. 6 is an end elevation of the same looking toward the rear end;

Fig. 7 is an end elevation looking toward the front end;

Fig. 8 is a horizontal sectional view taken centrally of the drill holder;

Fig. 9 is a transverse sectional view through one of the drill clamping jaws;

Fig. 10 is a longitudinal sectional view of the same, and

Fig. 11 is a detail view in side elevation of a modified form of support for the drill holder.

Figure 1:
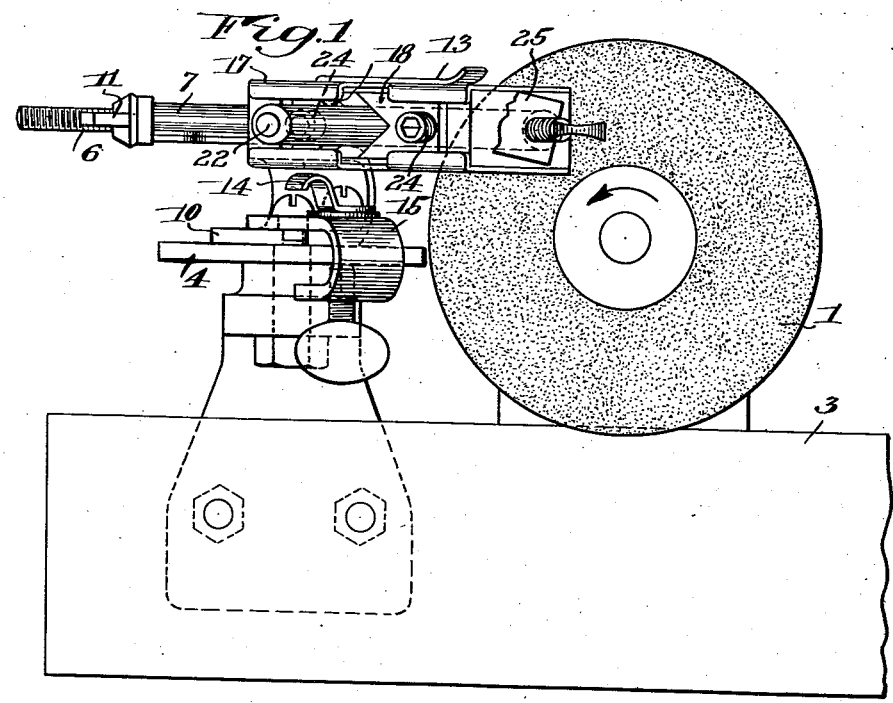
Fig. 1 is a view in end elevation looking toward the grinding wheel and illustrating the support with the drill holder in the initial grinding position.

Referring more particularly to the drawing, in which like reference numerals refer to the same parts throughout the several views, 1 designates a conventional grinding wheel driven by a suitable electric motor 2, supported on a base including an upright wall 3 to which is attached a table or platform 4 upon which is mounted the support for the drill holder and the cooperating parts that serve to position it properly on the table and to control its movement.

In the construction shown in Figs. 1 to 4 inclusive, which is intended only as an example of one embodiment of the invention, the support is in the form of a cylindrical bar 5 that is integral with or adjustably connected to the bar 6, the latter being mounted for oscillatory movement in a strap or bearing 7 that is adjustably secured to the top plate 9 of a bracket, which includes a bottom plate 10 adjustably attached to the table or platform 4. In Fig. 11, the bar 5 is shown as adjustably connected to the bar 6 by a conventional pivotal connection and adjusting nut, to permit varying the angular relation between the bars.

Figure 2:
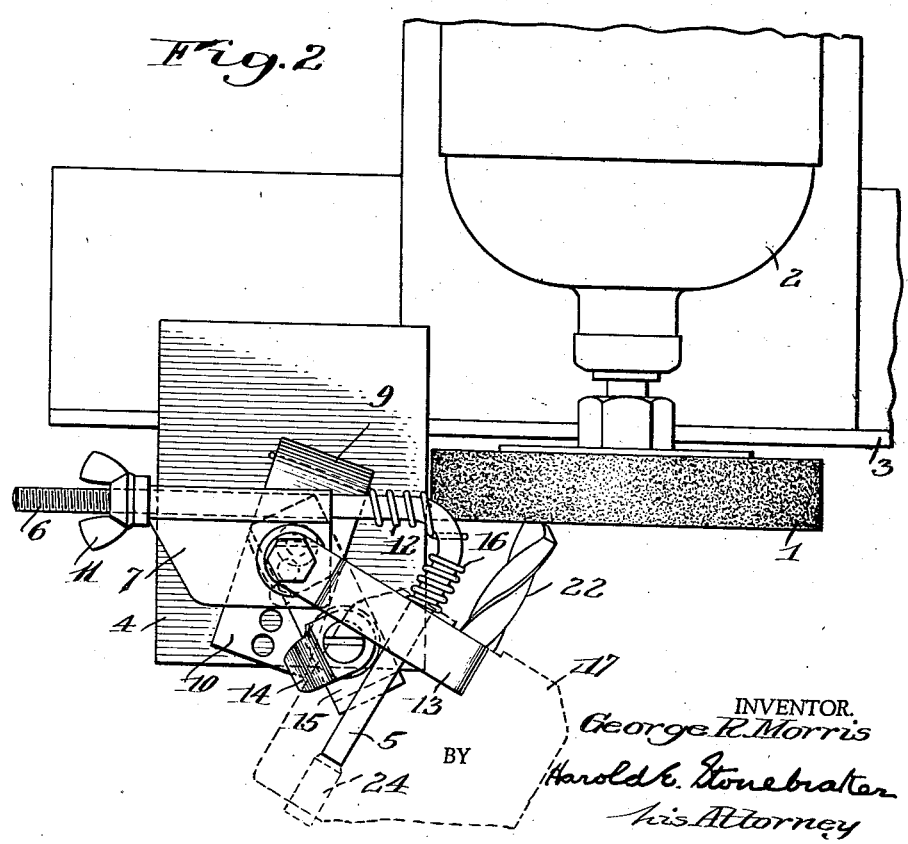
Fig. 2 is a plan view of the same, with the drill holder removed, and showing the initial position of the drill against the grinding wheel.

The bar 6 is adjustable endwise in the bearing 7 by means of the wing nut 11, and 12 designates a spring that acts to return the support 5 to its uppermost position as shown in Fig. 1, while 13 designates a stop or arm secured to the top plate 9 and extending laterally over the bar 5 and the drill holder to be described presently, and acting to limit the upward movement of the latter so as to hold it in horizontal position when the drill is in initial grinding position, as shown in Fig. 1. 14 designates an abutment adjustably mounted on a plate 15 by means of a set screw, as appears in Figs. 1 and 2, and the plate 15 is adjustably attached to the platform or table 4 by the bolt shown in Figs. 1 and 2 in order to locate the abutment 14 in the proper position underneath the drill holder to impart the proper rocking movement to the latter on the support 5 as the drill holder is pushed downwardly, in order to impart the desired bodily rolling motion to the clearance surface of the drill.

It will be understood that the support or bar 5 is adjusted on the table or platform so that when the drill holder is mounted thereon by sliding motion, the drill will be in the proper angular relation to the grinding wheel, as shown in Fig. 2. The drill holder is pushed inwardly toward the grinding wheel under the stop 13 and thereby maintained in horizontal position, as shown in Fig. 1.

The support 5 with the drill holder thereon is then moved downwardly about the axis of the bar 6 and at the same time the drill holder is rocked about the axis of the bar 5 when it engages the abutment 14 during its downward travel, the drill holder being grasped by the operator at its right side, as appearing in Fig. 2, and pushed downwardly while at the same time forcing it inwardly toward the grinding wheel 1 to move the drill into engagement therewith. This downward rocking movement of the drill holder about the two intersecting axes of the bars 5 and 6 brings about the desired bodily rolling movement of the clearance surface of the tool necessary to grind the lip or cutting edge and the clearance surface of the body of metal behind the cutting edge, and 16 designates a spring surrounding the bar 5 and acting to move the drill holder and drill away from the grinding wheel immediately it is released by the operator.

The drill holder or chuck may be of any suitable construction enabling it to be reversibly positioned on the support with either cutting edge properly located against the grinding wheel, and in the present structure, the drill holder includes a housing 17 within which are located opposite jaws 18 that are provided with suitable springs 20 for moving them away from each other when released, and fastening screws 21 for holding them in clamping relation to the drill 22.

Each jaw 18 is provided with a longitudinally extending opening 23 located parallel to the longitudinal axis of the drill, the openings 23 being on opposite sides thereof and closed at one end by the adjustable plugs 24 while open at the opposite end to permit the drill holder to slide on the bar or support 5 upon which it is permitted the rocking motion as already described. The plugs 24 serve to limit inward movement of the drill holder and drill toward the grinding wheel and thus to prevent excessive grinding of the cutting edge.

In order to locate the drill properly in the holder before tightening the clamping jaws, there is provided a positioning means consisting of an arcuate plate 25 having its ends pivoted to the housing 17 at the sides thereof on the fastening screw 21 while 26 is an opening in the central or body portion of the curved plate 25 to receive the point of the drill, and 27 is a stop for locating the cutting edge or lip of the drill, the stop 27 being pivotally attached to the curved plate 25 as for instance by means of an adjusting screw 28. To position the drill in the holder, the clamping screws 21 are loosened to release the jaws 18 and the positioning plate 25 is swung to the position illustrated in Fig. 6, whereupon the drill is inserted endwise between the jaws until the point of the drill enters the opening 26 of the positioning plate 25 which thus limits the endwise movement of the drill. Then the drill is turned in the holder until one cutting edge engages the stop 27, whereupon the clamping screws 21 are tightened to maintain the drill in the position thus established, after which the curved positioning plate 25, which is slightly yieldable, is compressed sufficiently to force it away from engagement with the point of the drill and is swung back to the position illustrated in Fig. 8, and the drill holder is then ready to be positioned on the support 5 for a grinding operation. It is first positioned with one hole 23 engaging the bar 5 to permit grinding one cutting edge of the drill, and when this has been properly ground and relieved by the double rocking motion already described, the drill holder is removed and repositioned on the bar 5 with the other hole 23 in engagement therewith, which brings the other cutting edge of the drill into exactly the same angular relation as the first mentioned edge since the drill is fixedly secured in the holder and the two openings in the holder, designated at 23, are symmetrically arranged on opposite sides of and parallel to the longitudinal axis of the drill.

With this arrangement, after the angular position of the support is once adjustably fixed, and the drill is properly clamped in the holder, the operator can readily grind both cutting edges and clearance surfaces accurately by moving the drill holder inwardly toward the grinding wheel to the proper extent and imparting the necessary rocking movement to the drill holder. The adjustable angle of the cutting edges and clearance surfaces is thus fixedly established and invariable for the two cutting edges. Any suitable interengaging means between the support and the drill holder may be used, as long as the instrumentalities on the drill holder are located on opposite sides of and parallel to the longitudinal axis of the drill to permit reversibly positioning the drill holder on the support so as to grind the two cutting edges and clearance surfaces to a preestablished angle and by a bodily rolling motion that is similar for both cutting edges of the drill.

While the invention has been described with reference to certain structural details, it is not confined to the precise mechanism herein illustrated, and this application is intended to cover any modifications or departures that may come within the purposes of the improvement and the scope of the following claims.

I claim:

1. In a drill grinder, the combination with a grinding wheel, of a support, and a drill holder movable on the support about an axis parallel to and offset from the axis of the drill, said drill holder being quickly removable from and reversible on the support and having duplicate support-engaging means on opposite sides of the drill axis, said support-engaging means being selectively and alternately engageable with the support by an endwise sliding movement and the drill holder being manually held on the support against the grinding wheel.

2. In a drill grinder, the combination with a grinding wheel, of an oscillatory support, and a drill holder having a rocking movement on the support about an axis parallel to and offset from the axis of the drill to impart a bodily rolling motion to a clearance surface of the drill, the drill holder being quickly removable from and reversible on the support and having duplicate support-engaging means on opposite sides of the drill axis, said support-engaging means being selectively and alternately engageable with the support by an endwise sliding movement and the drill holder being manually held on the support against the grinding wheel.

3. In a drill grinder, the combination with a grinding wheel, of a support having an oscillatory movement about an axis parallel to the grinding face of the wheel, and a drill holder movable on the support about another axis parallel to and offset from the axis of the drill and intersecting the first mentioned axis in order to effect a bodily rolling motion of a clearance surface of the drill against the grinding face of the wheel, the drill holder being quickly removable from and reversible on the support and having duplicate support-engaging means on opposite sides of the drill axis, said support-engaging means being selectively and alternately engageable with the support by an endwise sliding movement and the drill holder being manually held on the support against the grinding wheel.

4. In a drill grinder, the combination with a grinding wheel, of a support, and a drill holder movable on the support about two intersecting axes one of which is parallel to and offset from the axis of the drill to effect a bodily rolling motion of a clearance surface of the drill against the grinding wheel, the drill holder being quickly removable from and reversible on the support and having duplicate support-engaging means on opposite sides of the drill axis, said support-engaging means being selectively and alternately engageable with the support by an endwise sliding movement and the drill holder being manually held on the support against the grinding wheel.

5. In a drill grinder, the combination with a grinding wheel, of a support, and a drill holder removable from and reversibly positionable thereon, the drill holder having an oscillating movement on the support about an axis parallel to and offset from the axis of the drill and the support and drill holder being provided with interengaging instrumentalities, said instrumentalities on the drill holder being duplicated on opposite sides of and parallel to the longitudinal axis of the drill and alternately engageable with the support so as to enable positioning the opposite cutting edges and clearance surfaces of the drill against the grinding wheel, the drill holder being manually held on the support against the grinding wheel.

6. In a drill grinder, the combination with a grinding wheel, of an oscillatory support, and a drill holder removable from and reversibly positionable for oscillating movement thereon, said holder being movable about two intersecting axes one of which is parallel to and offset from the axis of the drill to impart a bodily rolling movement to a clearance surface of the drill against the grinding wheel, the support and drill holder having interengaging instrumentalities permitting a rocking movement of the drill holder on the support and said instrumentalities on the drill holder being duplicated on opposite sides of and parallel to the longitudinal axis of the drill and alternately engageable with the support to permit presenting the opposite cutting edges and clearance surfaces of the drill to the grinding wheel, the drill holder being manually held on the support against the grinding wheel.

7. In a drill grinder, the combination with a grinding wheel, of a support, a drill holder reversibly positionable on the support, and interengaging instrumentalities including a cylindrical bar on one of said parts while the other of said parts is provided with an opening to receive said bar and permit a relative oscillatory movement therebetween, the interengaging means on the drill holder being duplicated on opposite sides of the longitudinal axis of the drill and parallel thereto to permit positioning the drill holder on the support with either cutting edge and clearance surface against the grinding wheel.

8. In a drill grinder, the combination with a grinding wheel, of a support having an oscillatory movement about a given axis and including a cylindrical bar extending at an angle to said oscillatory axis, and a drill holder having openings located on opposite sides of and extending parallel to the longitudinal axis of the drill and selectively engageable with said bar to permit presenting opposite cutting edges and clearance surfaces of the drill to the grinding wheel.

9. In a drill grinder, the combination with a grinding wheel, of a support, and a drill holder having an oscillatory movement on the support about an axis parallel to and offset from the axis of the drill, said drill holder comprising a housing, a pair of separable jaws movably arranged in the housing for clamping a drill centrally of the housing, said jaws being provided with means extending endwise thereof on opposite sides of and parallel to the longitudinal axis of the drill and engageable with the support whereby the drill holder is reversibly positioned on the support by an endwise sliding movement to present the opposite cutting edges and clearance surfaces of the drill to the grinding wheel.

10. In a drill grinder, the combination with a grinding wheel, of a support, a drill holder having an oscillatory movement on the support and comprising a housing, a pair of separable jaws movably arranged in the housing for clamping a drill, said jaws being provided with means extending endwise thereof on opposite sides of and parallel to the longitudinal axis of the drill and engageable with the support whereby the drill holder is reversibly positioned on the support to present the opposite cutting edges and clearance surfaces of the drill to the grinding wheel, means for clamping the jaws against a drill, and means carried by the housing for positioning the drill before clamping, said means comprising a yieldable arcuate plate having its ends pivoted to opposite sides of the housing and its body portion positionable in line with the longitudinal axis of the drill, said body portion having an opening to receive the point of the drill, and a stop adjustably mounted on said plate for locating a cutting edge of the drill, said plate being movable on the housing away from the drill point after the drill is clamped.

11. In a drill grinder, the combination with a grinding wheel, of a support having an oscillatory motion about a given axis and including a cylindrical bar extending at an angle to said axis, a drill holder that is reversibly positionable on said bar and provided with openings located on opposite sides of and extending parallel to the longitudinal axis of the drill for selective engagement with said bar, a stop located above said bar for limiting upward movement of the drill holder when the latter is in a horizontal plane for the initial grinding position, and an abutment located beneath the bar in the path of movement of the drill holder for effecting the necessary bodily rocking motion of the latter on the bar as the drill holder is moved downwardly.

GEORGE R. MORRIS.